United States Patent [19]
Buzatu et al.

[11] 3,837,923
[45] Sept. 24, 1974

[54] TRANSPORTABLE STANDARD CELLS AND PROCESS FOR MAKING SAME

[75] Inventors: Corneliu Buzatu; Costica Topor, both of Bucharest, Romania

[73] Assignee: Institutul de Metrologie, Bucharest, Romania

[22] Filed: Jan. 24, 1972

[21] Appl. No.: 219,970

[52] U.S. Cl. ................................................. 136/88
[51] Int. Cl. ......................................... H01m 17/04
[58] Field of Search ............................ 136/88, 175

[56] References Cited
UNITED STATES PATENTS

| | | | |
|---|---|---|---|
| 2,553,068 | 5/1951 | Tucker | 136/88 |
| 2,810,007 | 10/1957 | Tucker et al. | 136/88 |

FOREIGN PATENTS OR APPLICATIONS

| | | | |
|---|---|---|---|
| 628,372 | 8/1949 | Great Britain | 136/88 |

Primary Examiner—A. B. Curtis
Assistant Examiner—C. F. Lefevour
Attorney, Agent, or Firm—Karl F. Ross; Herbert Dubno

[57] ABSTRACT

A standard cell adapted to withstand the rigors of transportation is made by introducing the cell components into respective components and packing the space bridging the components with a porous mass of glass or other inert particles to form a porous plug by vibrating the vessel or subjecting same to centrifugal force. The porous mass is then filled with electrolyte and the cell sealed.

2 Claims, 2 Drawing Figures

PATENTED SEP 24 1974  3,837,923

3,837,923

TRANSPORTABLE STANDARD CELLS AND PROCESS FOR MAKING SAME

FIELD OF THE INVENTION

The present invention relates to saturated or unsaturated standard cells adapted to withstand the rigors of transportation, hereinafter termed "transportable standard cell" and to a method of making same.

BACKGROUND OF THE INVENTION

Numerous systems have been provided heretofore to fix in place the chemical components of a standard cell to enable them to be transported without delocation of the components which must remain separated and bridged only by electrolyte. These techniques may use punched corks, plastic plugs, plugs or synthetic material which are also punched, punch disks or plastic material, porcelain or porous glass, tampons of linen-cotton-asbestor or synthetic materials etc. Substantially all of these techniques require vessel dimensioned with close size tolerance, having complicated shapes or by being provided with additional elements for fixing the structure retaining the chemical components in place. In some cases, the cell may be used in certain positions and in most instances the cell is of greater cost than non-transportable cells.

OBJECT OF THE INVENTION

It is the principal object of the present invention to provide an improved method of making a transportable cell, and a transportable standard cell made by this method, whereby the disadvantages of earlier systems are obviated.

SUMMARY OF THE INVENTION

This object and ather which will become apparent hereinafter are retained, in accordance with the present invention, in a transportable standard cell which comprises a vessel of glass or other insulating materials defining two compartments each of which receives a respective chemical component of the cell, respective electrodes extending through the walls of the vessel into chemical components of the respective compartments, and a porous plug of natural granulated glass, of granules or particles of the same composition as that of the receptacle, or particles of a material inert to the cell reaction which is introduced into the receptacle and vibrated or stirred by shaking and/or centrifugal rotation of the cell to closely pack the particles into a porous plug and pack them against the chemical components in the respective compartments. The electrolyte and depolarizer may be introduced into the cell in addition to a layer of cadmium sulphate crystals. The electrolyte is introduced to the top of the porous plug formed as described above when the vessel is held in an operating position.

DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
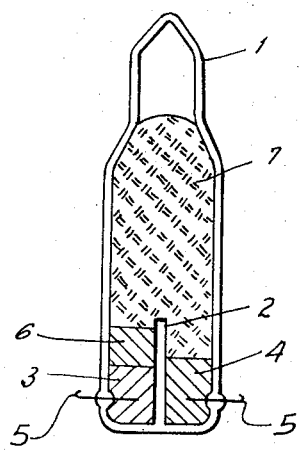
FIG. 1 is a cross-section through a monotube unsaturated transportable standard cell according to the invention.

As illustrated in the drawing a monotube unsaturated transportable standard cell (FIG. 1) comprises a tubular receptacle having, at least at its lower portion, an upstanding partition 2 integral with the receptacle and subdividing the latter into two compartments. In the left hand compartment there is disposed a mercury layer 3 and a depolarizing paste 6 overlying the mercury layer but below the level of the top of the partition 2. In the other components, there is disposed a layer 4 of cadmium amalgam. A pair of platinum wire electrodes extend through cells in the wall of the receptacle 1 into the layers 3 and 4, respectively in the two compartments and from the terminal by which the standard cell may be connected in an electrical circuit in accordance with conventional principles.

A granular layer of neutral glass or of granules or particles of the same material as the receptacle, i.e., neutral glass, forms a packing or a porous plug 7 to fix the substances in place. The upper end of the receptacle after an electrolyte consisting of a saturated solution of cadmium sulphate is introduced to imbibe the porous plug is closed.

Figure 2:
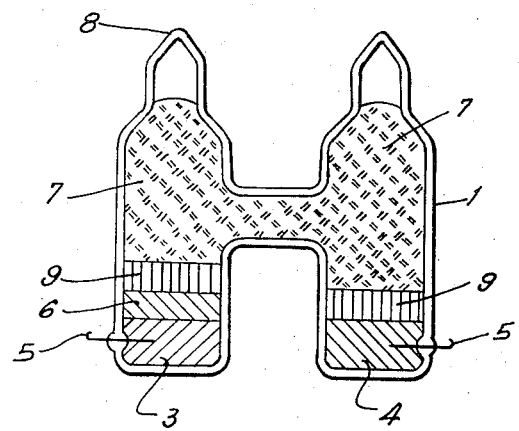
FIG. 2 is a cross-section through a transportable standard cell having an H-shaped receptacle.

As shown in FIG. 2 a saturated standard cell makes use of an H-shaped receptacle $1^1$ which is sealed at the tops of both compartments as represented at 8. In the bottom of the left hand tube there is provided a pool of mercury $3^1$ into which one platinum wire electrode $5^1$ extends, a layer $6^1$ of the depolarizing material, and a calcium sulphate crystal layer 9 overlying the depolarizer layer $6^1$ but disposed below the cross-tube of the H.

The right hand tube receives a cadmium analgam $4^1$ into which other platinum wire electrode $5^1$ extends, and a further layer 9 of cadmium sulphate crystals. Above the electrochemically active layers, there is disposed a neutral glass granule or particle mass $7^1$ of the same material as that of the receptacle, imbibed with electrolyte. The glass mass is vibrated and/or centrifugally stirred in both compartments to form a close packed porous structure of the particles filling the receptacles regardless of size (in cross-section) and is imbibed with electrolyte prior to the sealing of the cell.

The standard cells described above are simpler in shape, are free from the dimensional tolerances and avoid introducing foreign bodies which may influence electrical characteristics as is the case with earlier transportable cells. The cell of the present invention can even be inverted to an angle of 180° from its normal upright position as illustrated. The particle size of the granules is at most 1.5 mm.

We claim:

1. A method of making a standard cell comprising the steps of:
    introducing a plurality of electrochemically active layers into an insulating tube and in contact with electrodes embedded therein;
    substantially filling the remainder of said tube with a mass of electrically nonconductive particles having a maximum particle size of 1.5 mm, and setting said particles only by vibration or centrifugal displacement of said tube into a compact porous body fixed in place in said tube and retaining said layers against displacement;

imbibing said body with an electrolyte; and
sealing said tube.

2. A standard cell comprising an electrically insulating tube having a pair of electrodes embedded therein, at least two electrochemically active layers respectively in contact with said electrodes, a vibration-packed or centrifugally packed porous body of particles of an electrically non-conductive material substantially filling the remainder of said tubes and in contact with said layers for retaining same in place, and an electrolyte imbibing said body.

* * * * *